Sept. 16, 1969        S. JAGER        3,467,304
CENTRIFUGAL MACHINE

Filed Oct. 4, 1965        2 Sheets-Sheet 1

INVENTOR
SYBOUT JAGER
BY *Imrie & Smiley*
ATTORNEYS

United States Patent Office 3,467,304
Patented Sept. 16, 1969

3,467,304
CENTRIFUGAL MACHINE
Sybout Jager, Maarssen, Netherlands, assignor to Werkspoor N.V., Amsterdam, Netherlands, a company of the Netherlands
Filed Oct. 4, 1965, Ser. No. 492,550
Claims priority, application Netherlands, Oct. 6, 1964, 6411594
Int. Cl. B04b 1/00
U.S. Cl. 233—28                                7 Claims

ABSTRACT OF THE DISCLOSURE

Dispersion and distribution of solid substance within a mixture of two liquid phases to such an extent that the solid substance cannot be separated well from either liquid phase is prevented in a centrifuge by constraining the mixture containing the solid substance to flow initially under laminar flow conditions while the two liquid phases are separating. In this manner, the solid substance is confined almost wholly within and is contained by the heavier liquid phase. After separation of the two liquid phases, the flow in the mixture of the solid substance and heavier liquid phase is made turbulent so that the solid substance cannot be separated easily from such heavier liquid phase.

---

Figure 1:
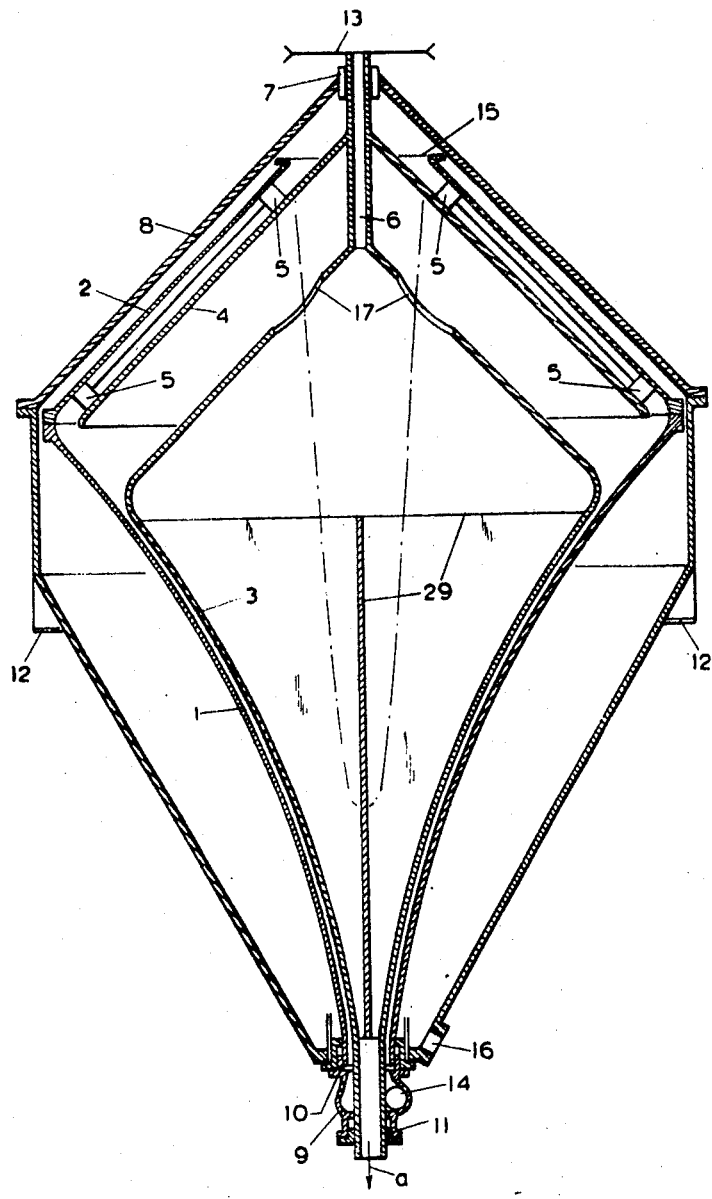

This invention relates to a centrifugal machine for separating a mixture of two liquid phases in continuous operation, said mixture being contaminated by solid substances and said machine being provided with a rotor widening from the inlet for the mixture in the form of a funnel. Some of the impurities contained in a mixture of liquid phases such as lime bound impurities in the first carbonation juice in the manufacture of beet sugar are so finely divided due to the large rotary accelerations occurring in the rotor and the turbulence generated thereby, that the mixture cannot well be separated.

The invention has for its object to remove said drawback and to obtain under all circumstances an effective separation of the mixture with the heavy phase in a highest possible concentration. According to the invention a hollow body is located in the rotor and provided with a circumferential wall, which is substantially of similar shape as the rotor wall widening from the inlet, said rotor wall surrounding the hollow body and leaving a relatively narrow flow space with respect thereto, the rotor wall at its wide end being narrowed again in the form of a funnel and a conical partition being arranged at some distance from the inner side of said rotor wall in such a manner that between said partition and said narrowing rotor wall a flow space for the heavier phase towards the overflow of the rotor is formed, an inlet for the mixture being tangentially connected to the narrow end of the rotor and the hollow inner body at its narrow end having an outlet for the lighter fraction. Notwithstanding the increasing rotary speed of the mixture in the space between the rotor wall and the inner body laminar flow rather than turbulence will occur with said construction so that the solid particles in the mixture will not be comminuted. At the outlet of said narrow flow space the heavy fraction is separated from the lighter fraction as said heavy fraction enters the space between said partition and the funnel shape narrowing circumferential wall of the rotor and leaves said space by the overflow at the narrow end of said wall. The lighter fraction flows into the hollow inner body provided with an outlet at its narrow end. Said body at its wide end remote from the outlet may be closed by a funnel-shaped wall and be provided with one or more inlet openings in said wall.

In order to prevent the separation of solid particles from the heavy fraction in the flow space between the narrowing part of the rotor wall and the conical partition preferably blades or like turbulence generating elements are provided in said space.

For preventing solid particles from depositing at the inlet of the flow space for the heavy fraction a similar shaped partition may be arranged in said flow space between the narrowing part of the rotor wall and the conical partition and said similar shaped partition may rotate with a speed differing from that of the rotor and be provided with an inwardly projecting rim. Said rim exerts a scraping action whereby clogging at the inlet of said flow space for the heavy fraction is prevented.

Figure 2:
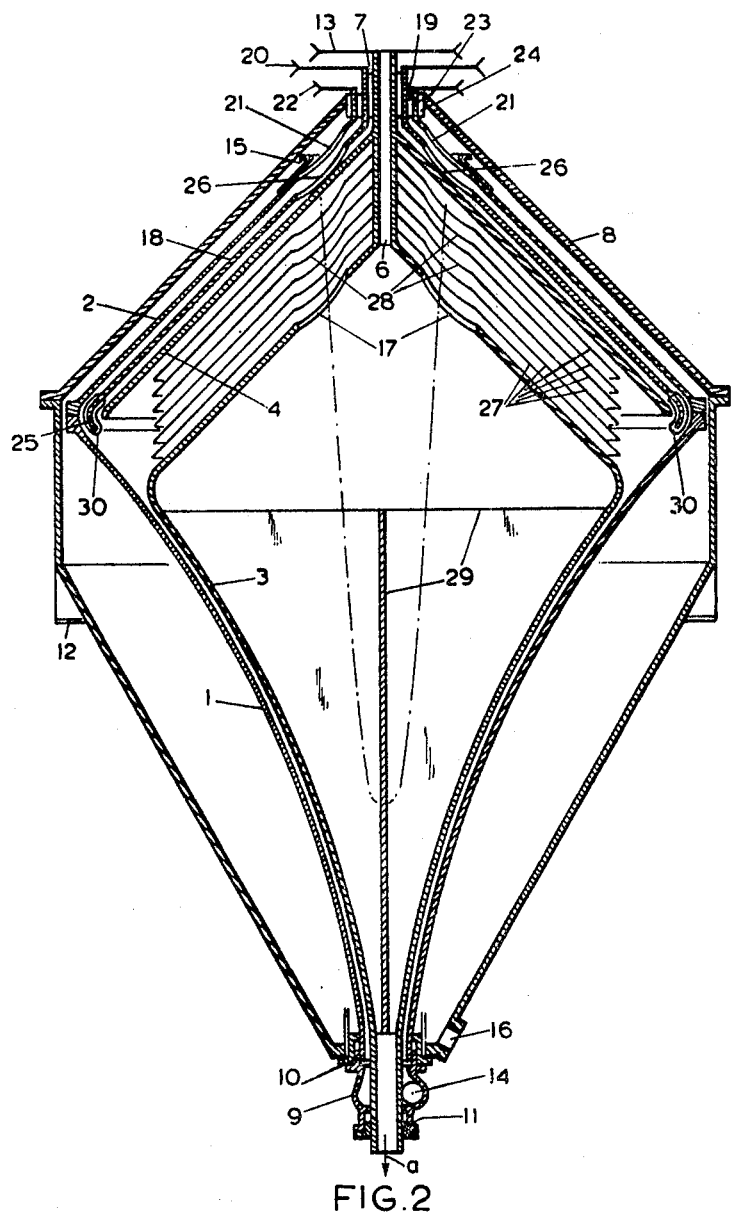

The invention will be further described with reference to the accompanying drawings illustrating two embodiments of the centrifugal machine according to the invention which each are shown in FIGS. 1 and 2 in a diagrammatic vertical sectional view.

The rotor of the centrifugal machine has a trumpet-shaped part 1 on which at its wide end a conical part 2 is secured. In the rotor 1, 2 a hollow inner body 3 is located, said body being surrounded by the trumpet-shaped part 1 of the rotor and leaves a narrow flow space at the inner side of part 1. A conical partition 4 extends in the rotor part 2 and by means of blades 5 is united with the rotor and is secured to a hollow shaft 6, connected to the inner body 3. The unit constituted by the rotor 1, 2 and the inner body 3 by means of the shaft 6 is journaled with its upper end at 7 in a casing 8 and at its narrowest end a stationary bowl 9 is provided in which the rotor is supported at 10 and the inner body 3 at 11.

The casing 8 has supporting feed 12 and a driving pulley 13 is secured to the end of the shaft 6 extending out of the casing.

The centrifugal machine illustrated in the drawings is particularly suitable for separating raw juice into clear juice and mud juice in the manufacture of beet sugar. The juice to be clarified is tangentially introduced at 14 into the bowl 9 so that the juice rotatably enters the narrow space between the rotor wall and the inner body 3. As the juice rises in said space, the lighter fraction, i.e., the clarified juice, is separated from the heavier fraction, i.e., the mud juice, and when the juice leaves said space the separation is completed so that only mud juice enters the space between the partition 4 and the rotor wall 2 and flows over the rim 15 in the casing 8 in order to leave the casing to the outlet 16. In the narrow space between the trumpet-shaped part 1 of the rotor and the inner body 3 the flow is substantially laminar, but as separation of solid particles from the mud juice in the space between the conical partition 4 and the rotor wall 2 is prevented by the blades 5 arranged in said space and which generate turbulence and thereby comminute the solid particles. The clear juice enters the space surrounding the upper part of the inner body 3, from which the juice flows into the body 3 through the passages 17. Under the influence of the rotation of the rotor 1, 2 the level of the juice in the rotor will present the shape indicated by a dash and dot line in the drawing and the juice leaves the casing at *a*.

Vertical partitions 29 are preferably arranged in the hollow inner body 3 for preventing the clear juice in said body from obtaining a more rapid rotation than the body itself. If the juice is allowed to rotate more rapidly than the body, the level of the juice extends deeper toward the outlet of the body 3 whereby the discharge of the juice would become too small by reason of the decrease of the liquid head and of the passage area.

The trumpet shape of the rotor presents the advantage over a conical shape having a straight generatrix that the curved generatrix of the rotor may have such a shape that the liquid in the rotor will have a uniform rotary acceleration for obtaining in this manner the required rotary speed within the restricted height of the rotor.

With the embodiment shown in FIG. 2 the inner body 3 is not united with the rotor part 2, so that an additional partition 18 may be provided in the space around the conical partition 4, said additional partition 18 being supported in a bearing 19 and driven by a driving pulley 20 with a speed differing from that of the rotor 1, 2 and the inner body 3 and therefore also from that of the partition 4. With said embodiment the rotor part 2 also has an overflow rim 15, but is extended above said rim and provided with passages 21 for the heavy fraction, e.g., mud juice. The rotor part 2 is terminated in a journal 23 supported in a bearing 24 and on which a driving pulley 22 is secured. The heavy fraction entering the space between the conical partition 4 and the rotor part 2 flows upwards in said space and passes through the openings 21 in order to flow over the rim 15 in the casing 8. The partition 18 has its lower end formed to a scooping edge 25 to which blades 30 are secured for preventing solid particles from depositing at the inlet of the space between the rotor wall and the partition 4. The additional partition 18 near its upper end is provided with passages 26. A number of conical plates 27 may be secured to the hollow shaft 6 between the upper part of the inner body 3 and the partition 4, said plates each having passages 28 for the light fraction such as clear juice.

What I claim is:

1. A centrifuge for separating in a continuous operation a mixture of two liquid phase components which is contaminated by solid substances, comprising at least a stationary casing, a shaft journaled in the top of said casing and extending thereinto, a rotor mounted on and driven by said shaft within said casing, an outlet for the heavier mixture component at the lower end of said casing, said rotor having a lower portion widening funnel-like from its lower end to an intermediate portion and then narrowing again in a funnel-like upper portion towards said rotor shaft, a rotatable hollow body located within said rotor, said body having a circumferential wall closely spaced from the lower portion of said rotor and defining a narrow first flow space for mixture liquid, an inlet for mixture liquid communicating with the lower end of said first flow space, a conical partition wall disposed in substantially parallel and closely spaced relation with the upper portion of said rotor to provide a second flow space communicating with said first flow space, the upper end of said rotor being open to provide an overflow for the heavier mixture component, and an outlet for said lighter mixture component at the lower end of said hollow body.

2. A centrifuge according to claim 1, in which said hollow body has a top part narrowing funnel-like toward said rotor shaft and secured thereto, the interior of said hollow body communicating with said first flow space through perforations in said top part thereof.

3. A centrifuge according to claim 1, in which turbulence creating elements are provided in said second flow space, said turbulence creating elements being secured to both said upper portion of the rotor and said conical partition wall.

4. A centrifuge according to claim 1, including an additional partition wall between said upper portion of the rotor and said conical partition wall, said additional partition wall being mounted for rotation independent of said rotor and carrying an inwardly extending peripheral rim to which turbulence generating elements are secured.

5. A centrifuge for separating a mixture of two liquid phases contaminated by solid substance into a heavier liquid phase containing said solid substance and a lighter liquid phase, comprising in combination,
   a generally bulbous hollow rotor open at its upper and lower ends and defining an upwardly divergent lower portion and an upwardly convergent upper portion joined at a waist portion of maximum diameter,
   a hollow inner body open at its upper and lower ends, said inner body being disposed within said rotor and having its open lower end concentric with the open lower end of said rotor and defining, with said lower portion of said rotor, a narrow passage of annular cross section discharging into the interior of said rotor below said waist portion and within which the mixture is constrained to flow upwardly in laminar fashion,
   means for introducing mixture to the lower end of said passage,
   a funnel-like partition wall disposed within said rotor and defining, with said upper portion thereof, a second narrow passage of annular cross section and leading from the interior of said rotor adjacent said waist portion to the open upper end of said rotor,
   and means for rotating said rotor, said inner body and said partition wall.

6. The centrifuge according to claim 5 including blade means extending between and interconnecting said partition wall and said upper portion of said rotor, said partition wall being connected to said inner body.

7. The centrifuge according to claim 5 including a second funnel-like partition wall disposed within and closely adjacent to the first partition wall, said second partition wall being connected to said inner body, the lower end of said first partition wall being provided with blades, and the last mentioned means including mechanism for driving said first partition wall at a speed different from that of said rotor.

References Cited

UNITED STATES PATENTS

| 968,327 | 8/1910 | Christianson | 127—56 |
|---|---|---|---|
| 1,492,168 | 4/1924 | Hapgood | 127—56 X |
| 1,724,254 | 8/1929 | Buckbee | 233—28 |
| 1,733,324 | 10/1929 | Wetherbee | 127—11 X |
| 2,073,388 | 3/1937 | Elliott et al. | 127—9 X |
| 3,022,937 | 2/1962 | Dega | 233—28 |

MORRIS O. WOLK, Primary Examiner

D. G. CONLIN, Assistant Examiner

U.S. Cl. X.R.

127—9, 13, 56; 210—380